United States Patent
Huang et al.

(10) Patent No.: US 9,274,672 B1
(45) Date of Patent: Mar. 1, 2016

(54) MONITORING OVERTIME OF TASKS

(71) Applicant: CA, Inc., Islandia, NY (US)

(72) Inventors: Ai Huang, Beijing (CN); Hai Liu, Beijing (CN)

(73) Assignee: CA, Inc., New York, NY (US)

( * ) Notice: Subject to any disclaimer, the term of this patent is extended or adjusted under 35 U.S.C. 154(b) by 194 days.

(21) Appl. No.: 13/915,472

(22) Filed: Jun. 11, 2013

(51) Int. Cl.
*G06F 3/0481* (2013.01)
*G06F 11/34* (2006.01)
*G06F 9/48* (2006.01)

(52) U.S. Cl.
CPC .................................. *G06F 3/0481* (2013.01)

(58) Field of Classification Search
CPC . G06F 11/3636; G06F 11/3466; G06F 17/00; G06F 2203/04808; G06F 3/013; G06F 3/0416; G06F 9/44526; G06F 11/364; G06F 9/4443; G06F 9/4881; G06F 9/50; G06F 9/5083
See application file for complete search history.

(56) References Cited

U.S. PATENT DOCUMENTS

| 5,907,490 A * | 5/1999 | Oliver ............................. 700/90 |
| 7,466,649 B1 * | 12/2008 | Chen et al. ..................... 370/225 |
| 2006/0010418 A1 * | 1/2006 | Gupta et al. ................... 717/101 |
| 2009/0102846 A1 * | 4/2009 | Flockermann et al. ....... 345/440 |

* cited by examiner

*Primary Examiner* — Amy Ng
*Assistant Examiner* — Tan Tran
(74) *Attorney, Agent, or Firm* — Gilliam IP PLLC

(57) ABSTRACT

A computer system monitors the execution time of each of a plurality of tasks over a plurality of time periods. The system receives a first input that selects a particular time period from the plurality of time periods, and further monitors the execution time of the plurality of tasks in the selected time period. The system receives a second input that selects a particular task from the particular time period, and monitors the execution time of the particular task in the particular time period.

20 Claims, 8 Drawing Sheets

MONITORING OVERTIME OF TASKS

TECHNICAL FIELD

The current disclosure relates to a system and method for monitoring tasks, and in an embodiment, but not by way of limitation, a system and method for monitoring tasks in a computer system.

BACKGROUND

In many computer business systems, tasks are monitored so that the status, health, and efficiency of the computer system can be determined. However, many a time, the monitoring of tasks for system developers is not the same as the monitoring of tasks for users or customers of the computer system.

For example when monitoring the start time or expected start time of a task, a developer has to know the exact time in order to know when to run the task. Users of the system also need to know the start time or expected start time of a task, but more important to such users is when they can obtain the calculations, results, or other output of the tasks.

As another example, when a task fails to run properly and/or completely, the task can be rerun or retried. If it runs successfully in the rerun, the task may still successfully complete before the expected end time of the task. In this situation, the user probably does not care about the unsuccessful first try or the errors associated therewith. The user is simply pleased that they obtained their results on time. The developer on the other hand needs to be aware of the error and needs to investigate the error to determine the cause of the error and a fix for the error.

Alternatively, a task can run successfully, but finish executing after its expected end time. From the developer's viewpoint, the task executed successfully because no errors occurred during execution. However, from the user's viewpoint, there was a problem because they did not receive their results on time, and something must be done to address this situation.

Similarly, when tasks are executing, alert messages can be generated. Such alert messages can be useful to the developer because they report on the status of a task. For a user however, they only want the results of the task and they want those results on time.

SUMMARY

Embodiments of the present disclosure include computer systems, computer processes, and computer processes embodied on computer readable media.

In a first example embodiment, such a system can be configured to monitor the execution time of each of a plurality of tasks over a plurality of time periods. The system receives a first input that selects a particular time period from the plurality of time periods, and monitors the execution time of the plurality of tasks in the selected time period. The system further receives a second input that selects a particular task from the particular time period, and monitors the execution time of the particular task in the particular time period.

In a second example embodiment, such a system can be configured to monitor execution of a plurality of tasks, record an amount of overtime for each of the plurality of tasks, and record data relating to a number of overtime tasks for the plurality of tasks. The system then displays on a computer display unit a first display of an amount of overtime for the plurality of tasks in a plurality of time ranges, and further displays on the computer display unit a second display of a percentage of overtime tasks for the plurality of time ranges. The system receives a first input selecting one or more time periods on the first display or the second display. In response to receiving the first input, the system displays on the computer display unit a third display of an amount of overtime for each of the tasks in the selected time period. In response to receiving the first input, the system can also display on the computer display unit a fourth display of a percentage of overtime for each of the tasks in the selected time period. The system receives a second input selecting one of the plurality of tasks from the third display or the fourth display, and in response to receiving the second input, the system displays on the computer display unit a fifth display of an amount of overtime for the selected task for a plurality of time ranges.

DETAILED DESCRIPTION

Figure 1:
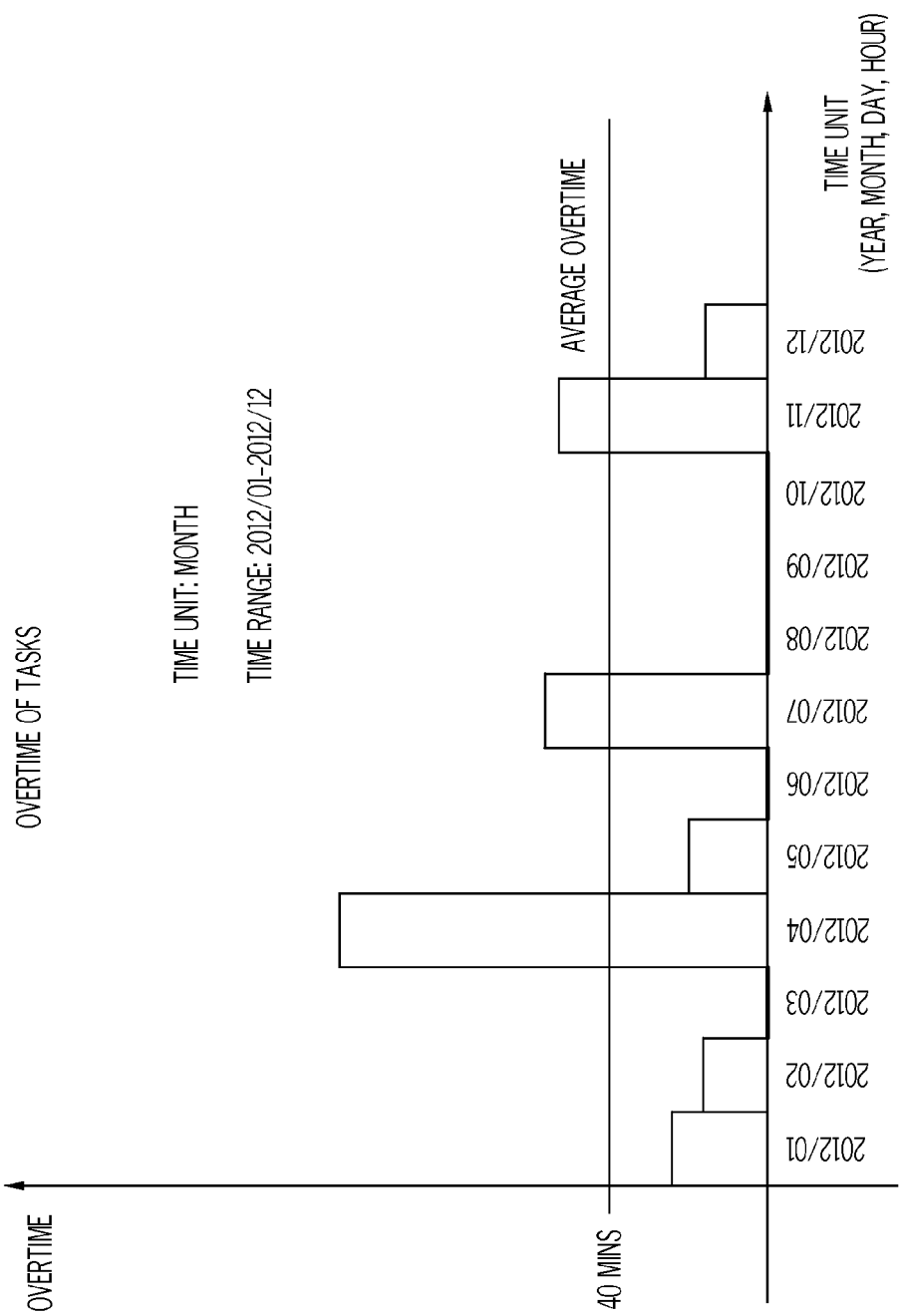
FIG. 1 is a bar chart illustrating amounts of overtime for a plurality of tasks.

In the following detailed description, reference is made to the accompanying drawings that show, by way of illustration, specific embodiments that may be practiced. These embodiments are described in sufficient detail to enable those skilled in the art to practice these embodiments. It is to be understood that the various embodiments, although different, are not necessarily mutually exclusive. For example, a particular feature, structure, or characteristic described herein in connection with one embodiment may be implemented within other embodiments without departing from the scope of the present disclosure. In addition, it is to be understood that the location or arrangement of individual elements within each disclosed embodiment may be modified without departing from the scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

In this disclosure, the following definitions are used. The expected end time of a task is the time that a task should be finished. In general, customers expect that each task should be completed before the expected end time. When a task completes after its expected end time, a record is created and/or marked as an overtime record. The following logic is used to calculate that amount of overtime for a task that has completed after its expected end time.

If (Expected End Time>Actual End Time)
    Overtime=0;

else

Overtime=Actual End Time−Expected End Time.

An overtime percentage is calculated by dividing the counts of overtime records in a particular time range by the total expected counts of tasks in the particular time range.

In general, to monitor tasks according to time, the following is executed. Two charts are generated. A first chart displays the overtime value for a plurality of task over a plurality of time periods, and another chart displays the overtime percentage for the plurality of tasks over the plurality of time periods. From one or both of these two charts, a customer selects a time range and unit, and the customer can then view task records in the time range using the overtime value chart and the overtime percentage chart. The user can further select one or several columns or bars in the charts (which represent a particular time period), and the customer can review all task records in the selected time range. The selection can be via a mouse click on the columns, bars, or other representation means on the display, or the selection can be any other input means of a computer system. A zoom feature is also provided so that customers can zoom in/out on the charts.

When monitoring tasks in the selected time range, using the two charts of the overtime value and overtime percentage, a user can select one or several columns in the displayed charts, or the user can set the time range, and the user can view the tasks in the selected time range or a special time range. Alternatively, a user can select a single task column or bar and view the task records for that selected column or bar. If there are a multitude of task records in the selected time range, the user can view the records over several pages on the computer display unit.

In an embodiment wherein the user can monitor one task in the selected time range, a single chart is displayed for the task status in the selected time range. A user can set one task name and the special time range, or generally click on or select the one or more charts to get an overview of all the records. Using the disclosed system and its charts, a user can easily find problematic tasks and more easily monitor tasks.

Figure 6A:
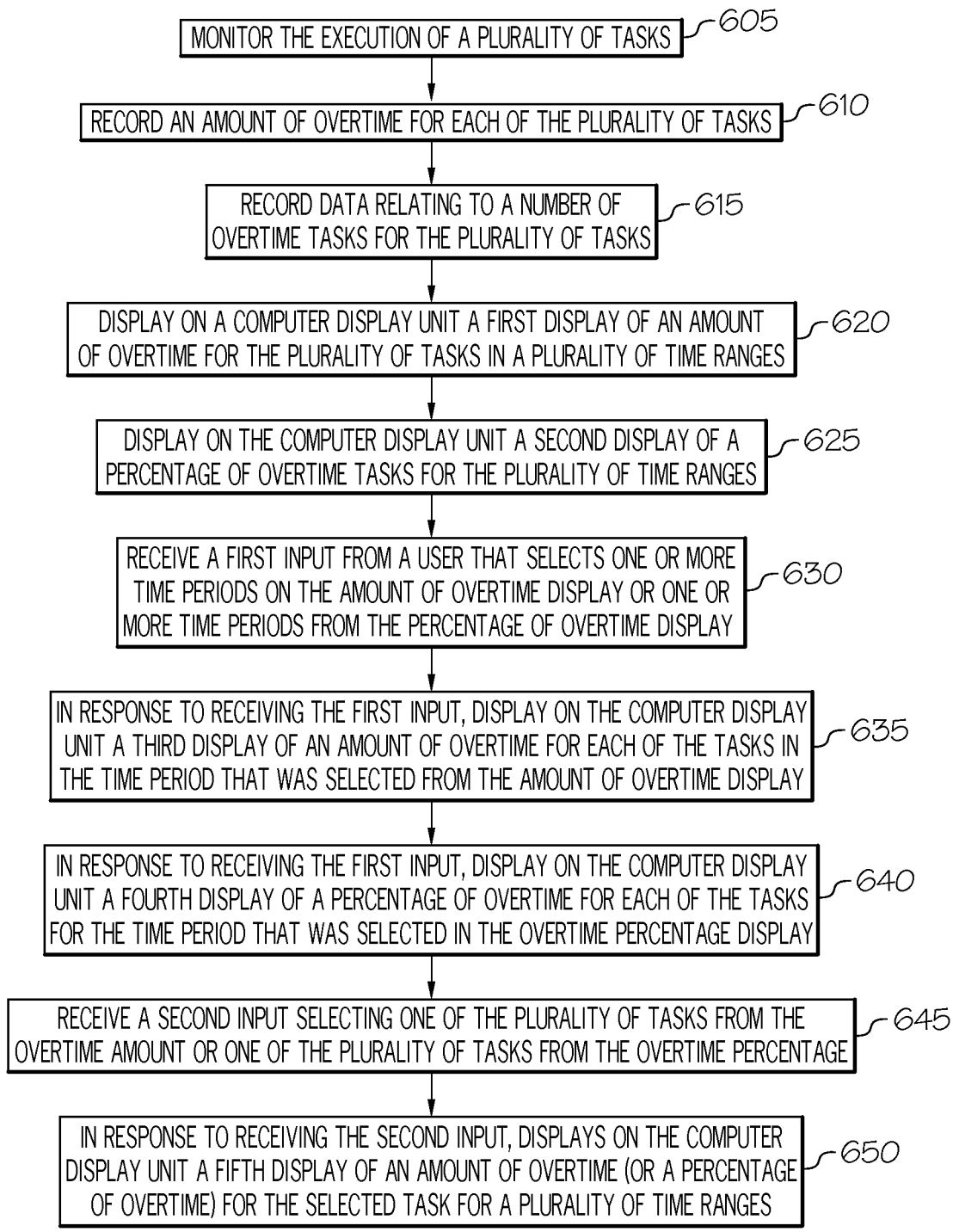
FIGS. 6A and 6B are block diagrams illustrating operations and features of a system and process for monitoring tasks.
Figure 6B:
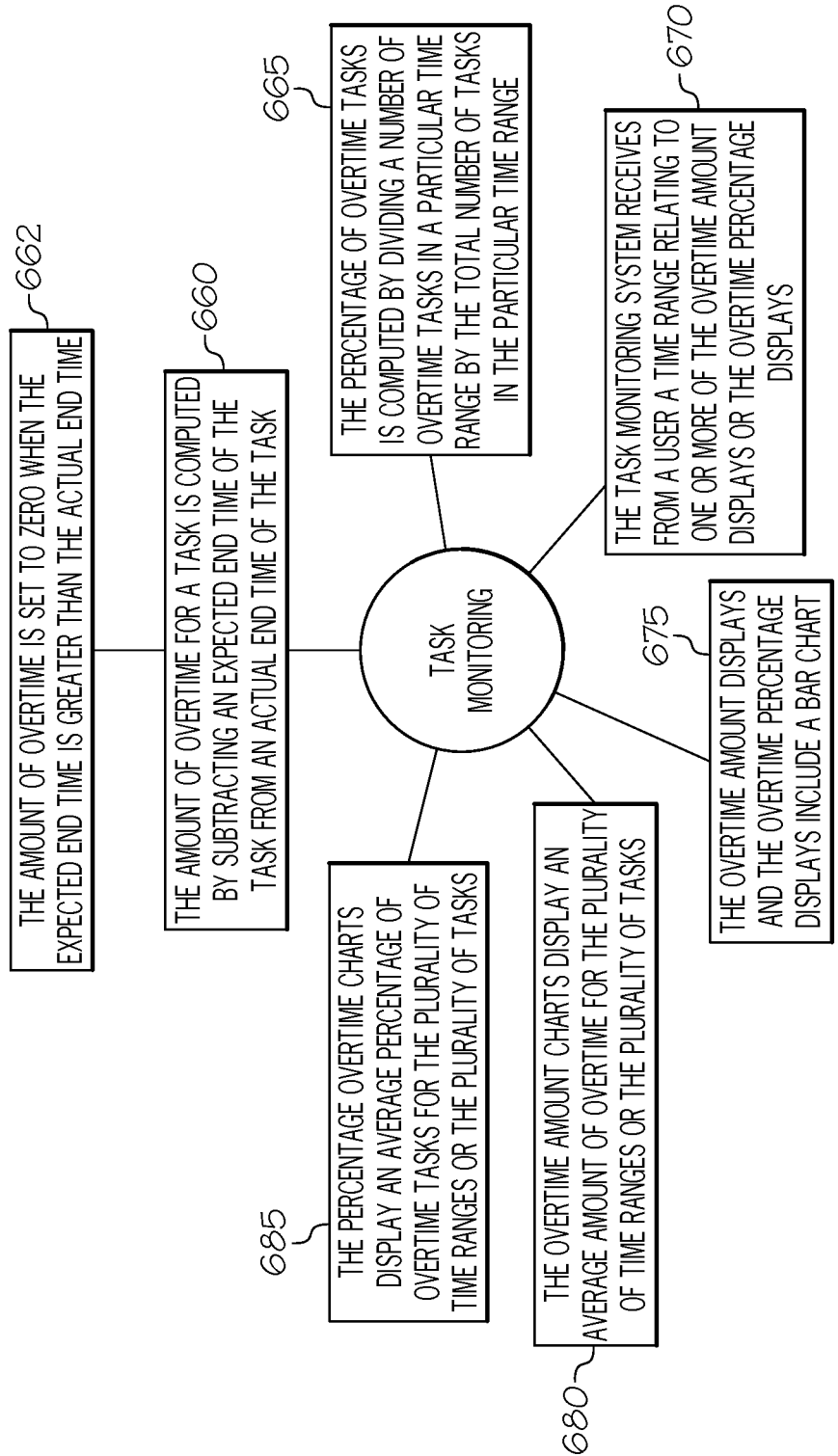

FIGS. 6A and 6B are block diagrams of features and operations of a system for monitoring tasks. FIGS. 6A and 6B include a number of blocks 605-685. Though arranged substantially serially in the example of FIGS. 6A and 6B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 6A, at 605, a system with a computer processor monitors the execution of a plurality of tasks. At 610, an amount of overtime is recorded for each of the plurality of tasks. As outlined above, if a task finishes before its expected end time, the amount of overtime associated with that task is zero. If the task finishes completion after the expected end time, the overtime associated with the task is calculated by subtracting expected end time from the actual end time. At 615, the system records data relating to a number of overtime tasks for the plurality of tasks.

At 620, the system displays on a computer display unit a first display of an amount of overtime for the plurality of tasks in a plurality of time ranges. An example of such a display is illustrated in FIG. 1. Specifically, FIG. 1 illustrates a bar graph wherein the abscissa represents time and the ordinate represents the amount of overtime. In the example of FIG. 1, the time unit is a single month, so that each bar in the bar graph represents a single month. For each month, the bar indicates the total amount of overtime for all of the system tasks for that month. For example, for the months of July and November, the amount of overtime for all the tasks in each of those months is above the average overtime of 40 minutes for all of the months.

Figure 2:
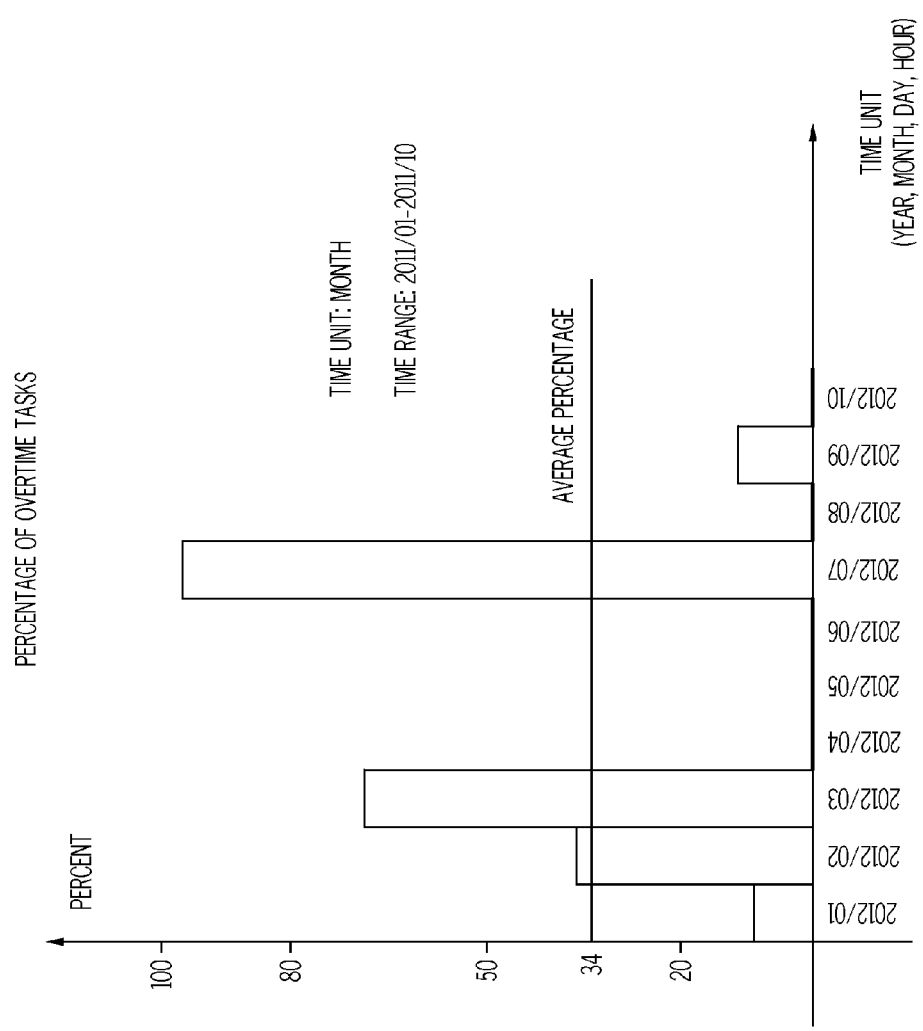
FIG. 2 is a bar chart illustrating percentages of overtime for a plurality of tasks.

At 625, the system displays on the computer display unit a second display of a percentage of overtime tasks for the plurality of time ranges. As noted above, the percentage of overtime tasks is calculated by dividing the counts of overtime records in a particular time range by the total expected counts of tasks in the particular time range. An example of such a percentage overtime display is illustrated in FIG. 2. In FIG. 2, the abscissa once again represents time, which in this example is a month. The ordinate represents the percentage of overtime tasks. Consequently, each bar in the graph of FIG. 2 represents the percentage of tasks that were overtime for all of the plurality of tasks in the corresponding month. For example, the percentage of tasks that experienced overtime in the month of February was slightly over the average percentage of 34%. In an embodiment, the bars can be color-coded such that percentages that fall between 80%-100% are colored in a first color, percentages that fall in the range of 60%-79% are color-coded a second color, percentages that fall in the range of 40%-59% are color-coded a third color, percentages that fall in the range 19%-39% are color-coded a fourth color, and percentages that fall in the range 0%-20% are color-coded a fifth color.

Figure 3:
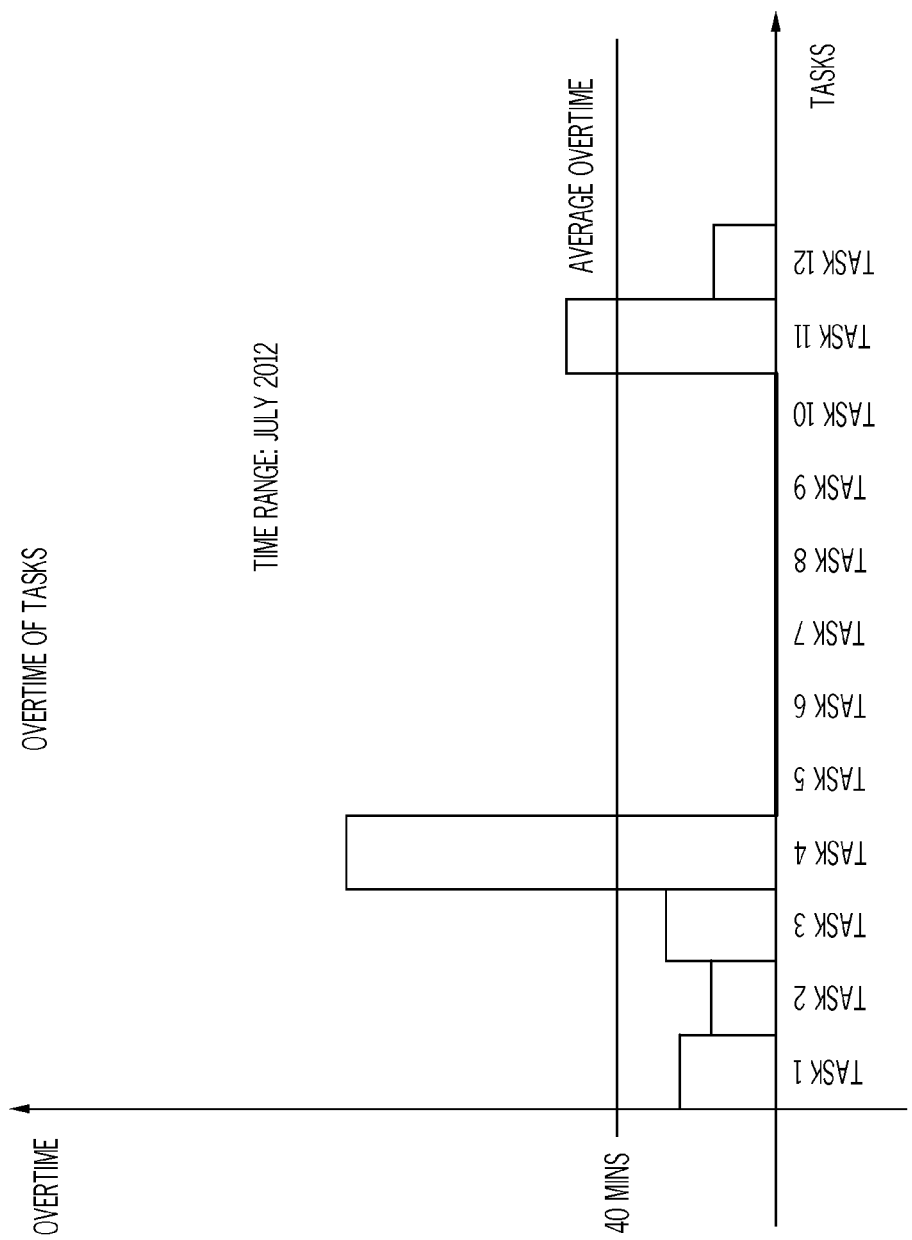
FIG. 3 is a bar chart illustrating amounts of overtime for a plurality of tasks.

At 630, the system receives a first input from a user that selects one or more time periods on the amount of overtime display of FIG. 1 or one or more time periods from the percentage of overtime display of FIG. 2. At 635, in response to receiving the first input, the system displays on the computer display unit a third display of an amount of overtime for each of the tasks in the time period that was selected from the amount of overtime display of FIG. 1. An example of such a graph is illustrated in FIG. 3. FIG. 3 illustrates that the month of July was selected from the overtime amount display of FIG. 1, and FIG. 3 illustrates the amount of overtime for each of tasks 1-12 in the month of July. As can be seen from FIG. 3, tasks 1-4 and 11-12 experienced an overtime amount in the month of July, and tasks 5-10 experienced no overtime in the month of July. That is, in the month of July, tasks 5-10 finished before their respective expected completion times.

Figure 4:
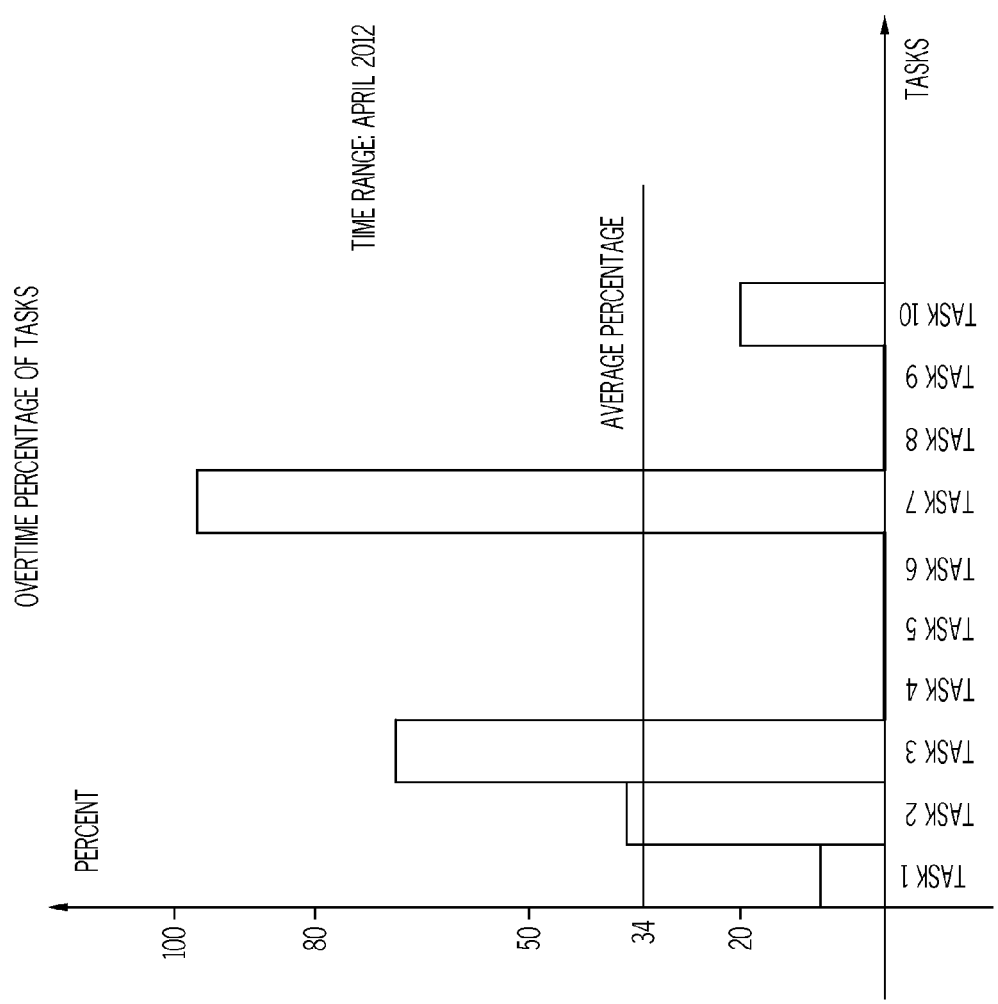
FIG. 4 is a bar chart illustrating percentages of overtime for a plurality of tasks.

At 640, in response to receiving the first input, the system displays on the computer display unit a fourth display of a percentage of overtime for each of the tasks for the time period that was selected in the overtime percentage display of FIG. 2. An example of such a display is illustrated in FIG. 4. FIG. 4 illustrates that the month of April was selected from FIG. 2, and further illustrates the overtime percentage for tasks 1-3 and 7 in the month of April 2012. As illustrated in FIG. 4, tasks 4-6 and 8-9 did not experience any overtime in the month of April 2012.

Figure 5:
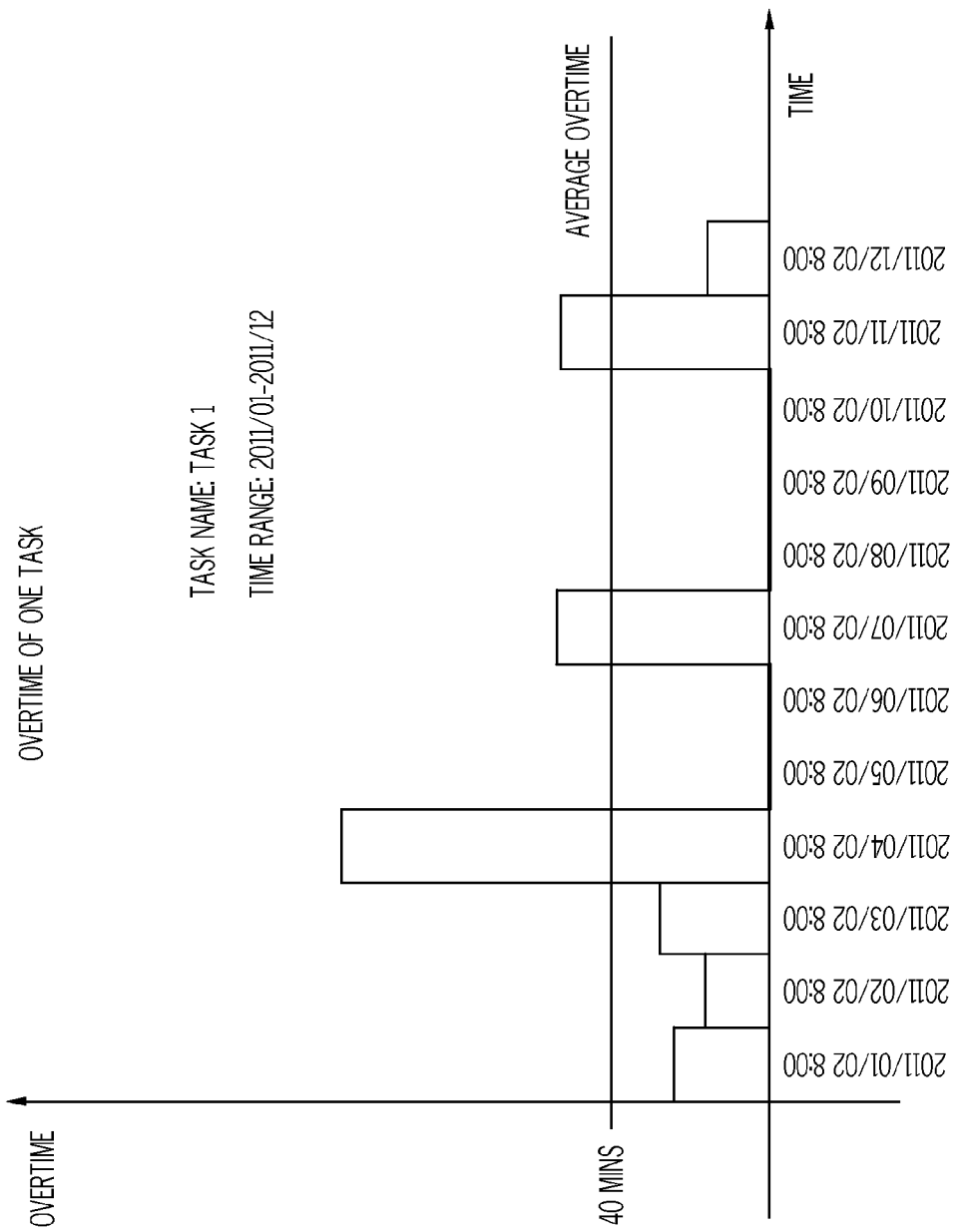
FIG. 5 is a bar chart illustrating amounts of overtime for a plurality of tasks.

At 645, the system receives a second input selecting one of the plurality of tasks from the overtime amount of FIG. 3 or one of the plurality of tasks from the overtime percentage of FIG. 4. At 650, in response to receiving the second input, the system displays on the computer display unit a fifth display of an amount of overtime (or a percentage of overtime if a time range from FIG. 4 is selected) for the selected task for a plurality of time ranges. FIG. 5 is a bar graph illustrating the amount of overtime for Task No. 1 for the year of 2011. As can be seen from FIG. 5, Task No. 1 ran past its expected completion time in the months of January-April, July, and November-December. Conversely, Task No. 1 experienced no overtime in the months of May-June and August-October.

Some additional features of the task monitoring system of FIG. 6A are illustrated in FIG. 6B. Block 660 illustrates that the amount of overtime for a task is computed by subtracting an expected end time of the task from an actual end time of the task. At 662, the amount of overtime is set to zero when the expected end time is greater than the actual end time. At 665, the percentage of overtime tasks is computed by dividing a number of overtime tasks in a particular time range by the total number of tasks in the particular time range. Block 670 illustrates that the task monitoring system receives from a user a time range relating to one or more of the overtime amount displays or the overtime percentage displays. Block 675 illustrates that the overtime amount displays and the overtime percentage displays include a bar chart. Block 680 illustrates that the overtime amount charts display an average amount of overtime for the plurality of time ranges or the plurality of tasks. Block 685 illustrates that the percentage overtime charts display an average percentage of overtime tasks for the plurality of time ranges or the plurality of tasks.

Figure 7:
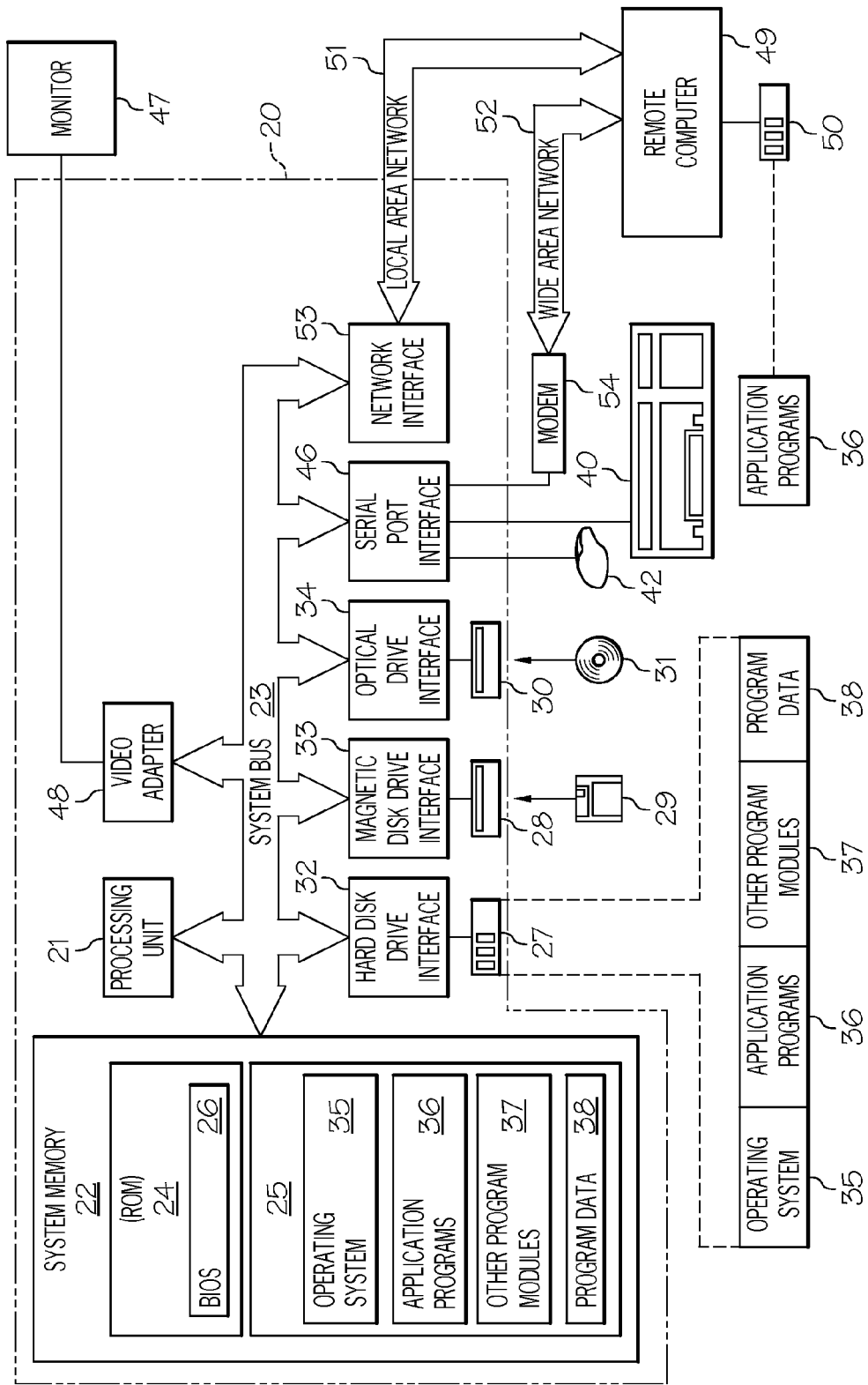
FIG. 7 is a block diagram illustrating an example of a computer system upon which one or more of the embodiments of this disclosure can execute.

FIG. 7 is an overview diagram of hardware and an operating environment in conjunction with which embodiments may be practiced. The description of FIG. 7 is intended to provide a brief, general description of suitable computer hardware and a suitable computing environment in conjunction with which the embodiments may be implemented. Some embodiments are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, and the like. Embodiments may also be practiced in distributed computer environments where tasks are performed by I/0 remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for one or more embodiments can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the disclosed embodiments are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for monitoring tasks have been described. Although specific example embodiments have been described, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A system comprising:
   a computer display unit;
   a computer processor; and
   a computer readable storage medium having computer readable program code, the computer readable program code executable by the computer processor to cause the system to:
   over a time period, monitor multiple executions of a plurality of tasks of a computer system, wherein the plurality of tasks are monitored for status, health, and efficiency of the computer system;
   determine an amount of overtime for each execution of each of the plurality of tasks, wherein the amount of overtime is determined as a difference between an expected end time of a task and an actual end time of the task;
   record the determined amounts of overtime;
   determine a total amount of overtime for the plurality of tasks for a plurality of time ranges within the time period;
   display on the computer display unit a first display of total amount of overtime for the plurality of tasks in the plurality of time ranges;
   display on the computer display unit a second display of a percentage of tasks with overtime for the plurality of tasks in the plurality of time ranges, wherein the percentage of tasks with overtime is computed by dividing a number of tasks with overtime by a total number of the plurality of tasks;
   receive a selection of one of a plurality of time ranges;
   in response to receiving the selection of one of a plurality of time ranges,
   display on the computer display unit a third display of a total amount of overtime for each of the tasks in the selected one of the plurality of time ranges; and
   display on the computer display unit a fourth display of a percentage of tasks with overtime for each of the tasks in the selected one of the plurality of time ranges;
   receive a selection of one of the plurality of tasks; and
   in response to receiving the selection of one of the plurality of tasks, display on the computer display unit a fifth display of an amount of overtime for the selected task for the plurality of time ranges.

2. The system of claim 1, wherein an amount of overtime for a task of the plurality of tasks is set to zero when the expected end time is greater than the actual end time.

3. The system of claim 1, wherein the computer readable storage medium further comprises computer readable program code executable by the computer processor to cause the system to receive from a user a selection of one of a plurality of time ranges relating to one or more of the first display, the second display, the third display, the fourth display, and the fifth display.

4. The system of claim 1, wherein one or more of the first display, the second display, the third display, the fourth display, and the fifth display comprise a bar chart.

5. The system of claim 1, wherein one or more of the first display, the third display, and the fifth display comprise a display of an average amount of overtime for the plurality of time ranges or the plurality of tasks.

6. The system of claim 1, wherein one or more of the second display and the fourth display comprise a display of an average percentage of tasks with overtime for the plurality of time ranges or the plurality of tasks.

7. The system of claim 1, wherein one or more of the first display, the second display, the third display, the fourth display, and the fifth display comprise a display of an identifier for each of the plurality of time ranges or each of the plurality of tasks.

8. A non-transitory computer readable medium having program code stored therein, the program code to:
  over a time period, monitor multiple executions of a plurality of tasks of a computer system, wherein the plurality of tasks are monitored for status, health, and efficiency of the computer system;
  determine an amount of overtime for each execution of each of the plurality of tasks, wherein the amount of overtime is determined as a difference between an expected end time of a task and an actual end time of the task;
  record the determined amounts of overtime;
  determine a total amount of overtime for the plurality of tasks for a plurality of time ranges within the time period;
  display on a computer display unit a first display of total amount of overtime for the plurality of tasks in the plurality of time ranges;
  display on the computer display unit a second display of a percentage of tasks with overtime for the plurality of tasks in the plurality of time ranges, wherein the percentage of tasks with overtime is computed by dividing a number of tasks with overtime by a total number of the plurality of tasks;
  receive a selection of one of a plurality of time ranges;
  in response to reception of the selection of one of a plurality of time ranges,
    display on the computer display unit a third display of total amount of overtime for each of the tasks in the selected one of the plurality of time ranges; and
    displaying on the computer display unit a fourth display of a percentage of tasks with overtime for each of the tasks in the selected one of the plurality of time ranges;
  receive a selection of one of the plurality of tasks; and
  in response to reception of the selection of one of the plurality of tasks, display on the computer display unit a fifth display of an amount of overtime for the selected task for the plurality of time ranges.

9. The non-transitory computer readable medium of claim 8, wherein an amount of overtime for a task of the plurality of tasks is set to zero when the expected end time is greater than the actual end time.

10. The non-transitory computer readable medium of claim 8, further comprising program code to receive from a user a selection of one of a plurality of time ranges relating to one or more of the first display, the second display, the third display, the fourth display, and the fifth display.

11. The non-transitory computer readable medium of claim 8, wherein one or more of the first display, the second display, the third display, the fourth display, and the fifth display comprise a bar chart.

12. The non-transitory computer readable medium of claim 8, wherein one or more of the first display, the third display, and the fifth display comprise a display of an average amount of overtime for the plurality of time ranges or the plurality of tasks.

13. The non-transitory computer readable medium of claim 8, wherein one or more of the second display and the fourth display comprise a display of an average percentage of tasks with overtime for the plurality of time ranges or the plurality of tasks.

14. A method comprising:
  over a time period, monitoring multiple executions of a plurality of tasks of a computer system, wherein the plurality of tasks are monitored for status, health, and efficiency of the computer system;
  determining an amount of overtime for each execution of each of the plurality of tasks, wherein the amount of overtime is determined as a difference between an expected end time of a task and an actual end time of the task;
  recording the determined amounts of overtime;
  determining a total amount of overtime for the plurality of tasks for a plurality of time ranges within the time period;
  displaying on the computer display unit a first display of a total amount of overtime for the plurality of tasks in the plurality of time ranges;
  displaying on the computer display unit a second display of a percentage of tasks with overtime for the plurality of tasks in the plurality of time ranges, wherein the percentage of tasks with overtime is computed by dividing a number of tasks with overtime by a total number of the plurality of tasks;
  receiving a selection of one of a plurality of time ranges;
  in response to receiving the selection of one of a plurality of time ranges,
    displaying on the computer display unit a third display of a total amount of overtime for each of the tasks in the selected one of the plurality of time ranges; and
    displaying on the computer display unit a fourth display of a percentage of tasks with overtime for each of the tasks in the selected one of the plurality of time ranges;
  receiving a selection of one of the plurality of tasks; and
  in response to receiving the selection of one of the plurality of tasks, displaying on the computer display unit a fifth display of an amount of overtime for the selected task for the plurality of time ranges.

15. The method of claim 14, wherein an amount of overtime for a task of the plurality of tasks is set to zero when the expected end time is greater than the actual end time.

16. The method of claim 14, further comprising receiving from a user a selection of one of a plurality of time ranges relating to one or more of the first display, the second display, the third display, the fourth display, and the fifth display.

17. The method of claim 14, wherein one or more of the first display, the second display, the third display, the fourth display, and the fifth display comprise a bar chart.

18. The method of claim 14, wherein one or more of the first display, the third display, and the fifth display comprise a display of an average amount of overtime for the plurality of time ranges or the plurality of tasks.

19. The method of claim 14, wherein one or more of the second display and the fourth display comprise a display of an average percentage of tasks with overtime for the plurality of time ranges or the plurality of tasks.

20. The method of claim 14, wherein one or more of the first display, the second display, the third display, the fourth display, and the fifth display comprise a display of an identifier for each of the plurality of time ranges or each of the plurality of tasks.

* * * * *